United States Patent [19]
Goodwin, III

[11] Patent Number: 6,021,395
[45] Date of Patent: Feb. 1, 2000

[54] SYSTEM AND METHOD OF MANAGING DISPLAYED MESSAGE PRIORITIES IN AN EPL SYSTEM

[75] Inventor: John C. Goodwin, III, Suwanee, Ga.

[73] Assignee: NCR Corporation, Dayton, Ohio

[21] Appl. No.: 09/144,293

[22] Filed: Aug. 31, 1998

[51] Int. Cl.[7] .................................................. G06F 17/60
[52] U.S. Cl. ............................ 705/20; 705/16; 705/21; 705/27; 705/400; 364/151; 364/152; 364/153; 235/383; 340/825.35
[58] Field of Search .............................. 705/21, 27, 16, 705/400; 364/152, 153, 151; 235/383; 340/825.35

[56] References Cited

U.S. PATENT DOCUMENTS

| | | | |
|---|---|---|---|
| 4,002,886 | 1/1977 | Sundelin | 235/64.7 R |
| 4,500,880 | 2/1985 | Gomersall et al. | 340/825.35 |
| 4,924,363 | 5/1990 | Kornelson | 362/125 |
| 5,172,314 | 12/1992 | Poland et al. | 364/401 |
| 5,448,226 | 9/1995 | Failing, Jr. et al. | 340/825.35 |
| 5,870,714 | 2/1999 | Shetty et al. | 705/20 |
| 5,873,069 | 2/1999 | Reuhl et al. | 705/20 |
| 5,945,975 | 8/1999 | Lundtigan et al. | 345/133 |

*Primary Examiner*—James P. Trammell
*Assistant Examiner*—Chinor M. Lee, I
*Attorney, Agent, or Firm*—Paul W. Martin

[57] ABSTRACT

A system and method of managing displayed message priorities in an electronic price label (EPL) system through a data file containing message records including message priorities for each EPL. The system includes a computer which stores a plurality of records for an electronic price label in a data file, which reads the data file to identify all of the records for the electronic price label, which determines the priorities in the records, and which displays the messages at start times within the records in accordance with the priorities. The computer records the records in response to operator input and/or inputs received from an application program through an application programming interface. For inputs received from application programs, the computer establishes new priorities for the messages based upon different application priorities assigned to the application programs.

10 Claims, 4 Drawing Sheets

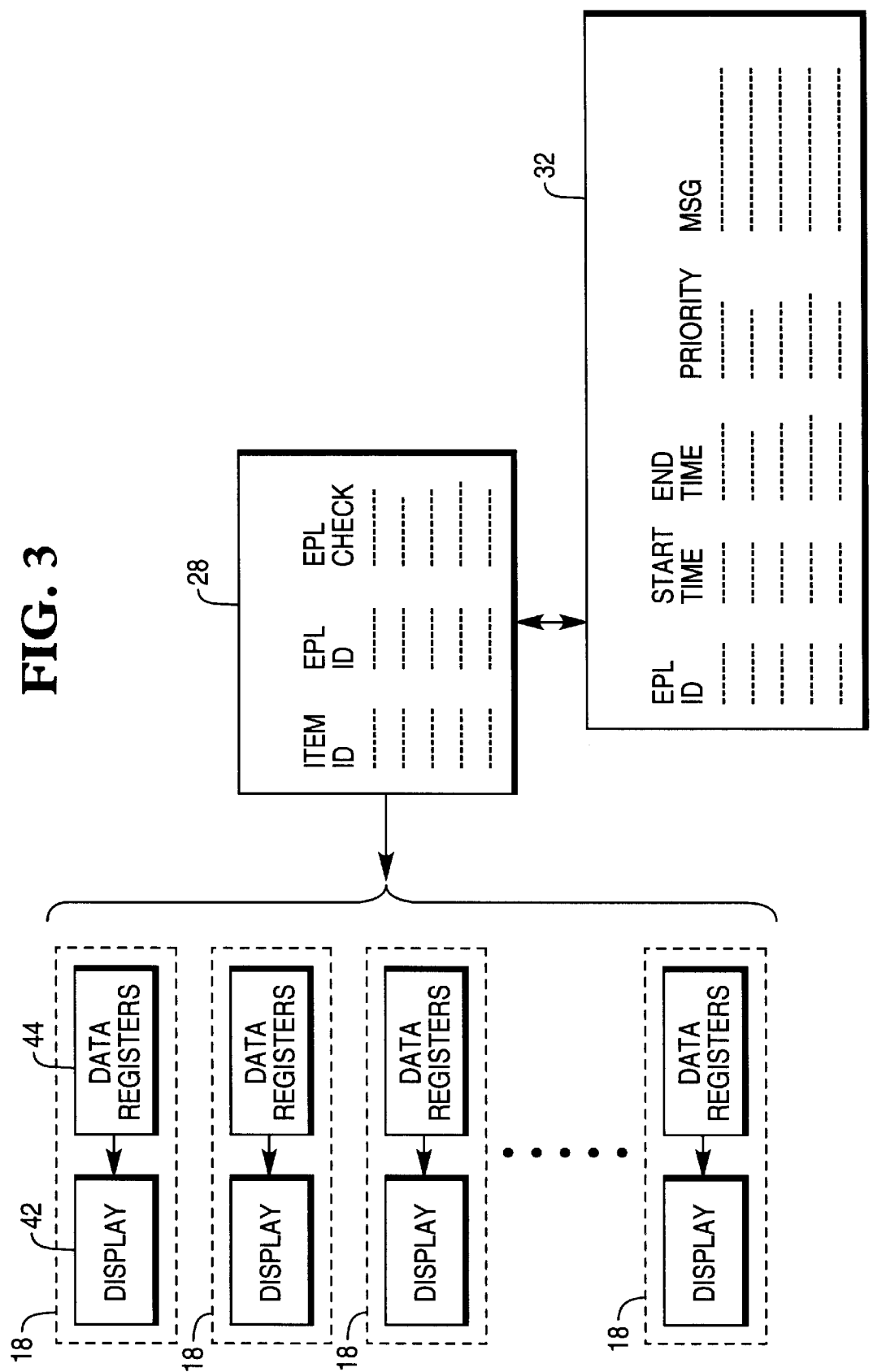

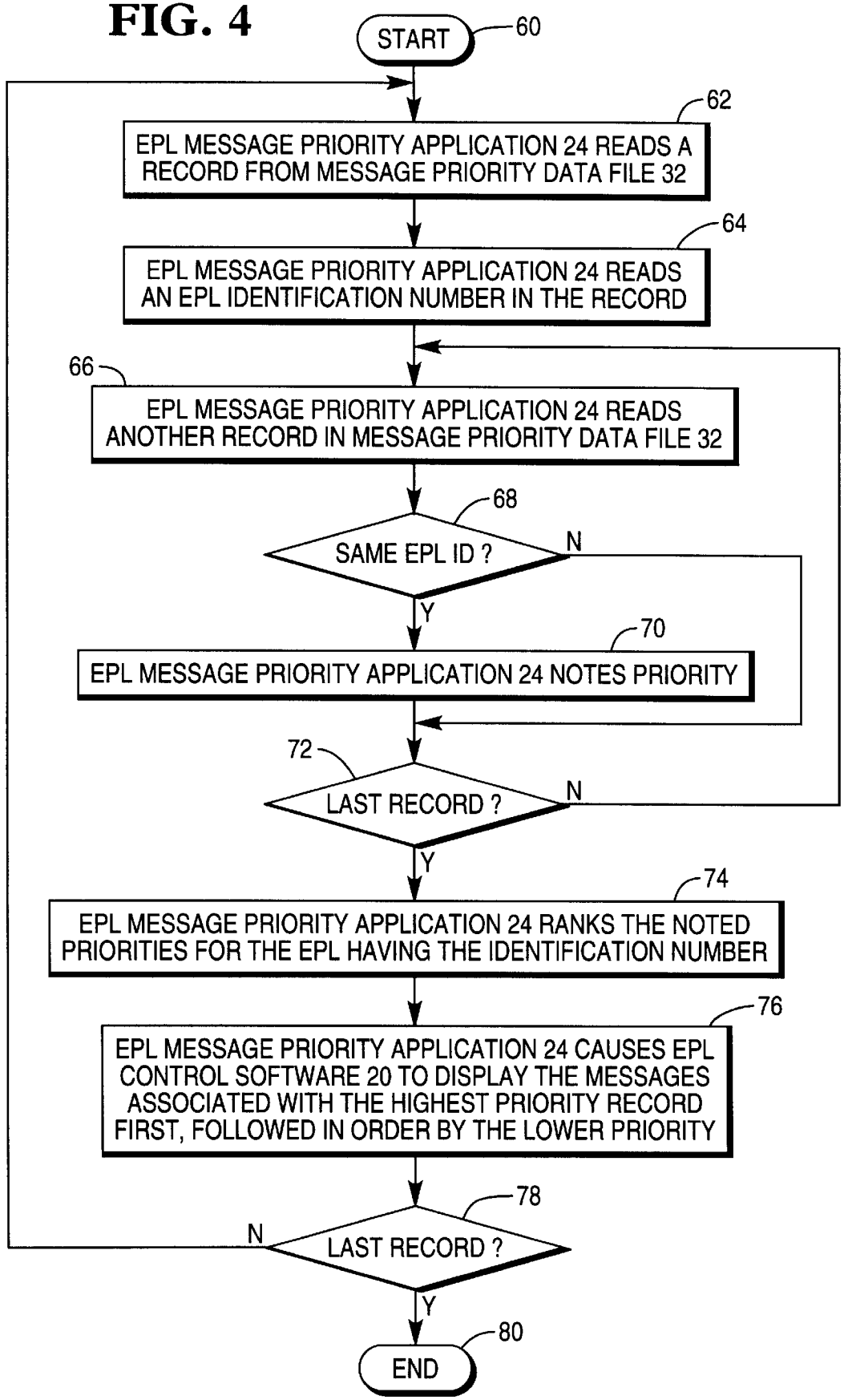

SYSTEM AND METHOD OF MANAGING DISPLAYED MESSAGE PRIORITIES IN AN EPL SYSTEM

BACKGROUND OF THE INVENTION

The present invention relates to electronic price label (EPL) systems, and more specifically to a system and method of managing displayed message priorities in an EPL system.

Point-of-sale (POS) transaction processing systems typically include a price look-up (PLU) file which contains item identification information and item price information.

EPL systems typically include a plurality of EPLs for merchandise items in a transaction establishment. EPLs typically display the price of corresponding merchandise items on store shelves and are typically attached to a rail along the leading edge of the shelves. A transaction establishment may contain thousands of EPLs to display the prices of the merchandise items. The EPLs are coupled to a central server from where information about the EPLs is typically maintained in an EPL data file. Price information displayed by the EPLs is obtained from the PLU data file and stored within an EPL price change record.

Retailers wish to display ever increasing amounts of information besides price information. Current EPLs include a limited amount of memory, which is primarily used to store price information. Memory capacity in currently available EPLs can be as low as thirty-two bits, which is typically spread across four eight-bit data registers. One data register must be reserved for price information. Thus, only three data registers remain for displaying promotional information. Even if new EPLs with more data registers become available, it would be too expensive to replace ever the old EPLs. Thus, management of combinations of old and new EPLs complicates the problem.

Therefore, it would be desirable to provide a system and method of managing displayed message priorities in an EPL system which is capable of using limited amounts of EPL memory to effectively display promotional information. It would also be desirable to provide a method of managing EPLs of various memory capacities.

SUMMARY OF THE INVENTION

In accordance with the teachings of the present invention, a system and method of managing displayed message priorities in an electronic price label (EPL) system is provided.

The system includes a computer which stores a plurality of records for an electronic price label in a data file, which reads the data file to identify all of the records for the electronic price label, which determines the priorities in the records, and which displays the messages at start times within the records in accordance with the priorities. The computer records the records in response to operator input and/or inputs received from an application program through an application programming interface. For inputs received from application programs, the computer establishes new priorities for the messages based upon different application priorities assigned to the application programs.

The method includes the step of providing a plurality of records for the electronic price label in a data file, wherein each record contains a different message to be displayed by the electronic price label, a different priority for each message, a start time for each message, and an end time for each message. The method further includes the steps of reading the data file to identify all of the records for the electronic price label, determining the priorities in the records, and displaying the messages at the start times in accordance with the priorities.

The providing step may include the substep of recording the records by a computer in response to operator input and/or in response to inputs received from an application program through an application programming interface. For inputs received from application programs, the computer establishes new priorities for the messages based upon different application priorities assigned to the application programs.

It is a feature of the present invention that a first message have a first priority is stored within a data file and may be replaced by a second message also stored within the data file having a second priority which is higher than the first priority. If the period of display of the second message is within the period of display of the first message, then the first message is temporarily replaced by the second message.

It is accordingly an object of the present invention to provide a system and method of managing displayed message priorities in an EPL system.

It is another object of the present invention to provide a system and method of managing displayed message priorities in an EPL system which temporarily stores information to be displayed again at a later time to a data file.

It is another object of the present invention to provide a system and method of managing displayed message priorities in an EPL system which temporarily stores regular information displayed by an EPL in a data file, causes the EPL to display temporary information during a special promotion, and causes the EPL to display the regular information following expiration of the special promotion.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 3 is a diagram showing data files used within a transaction establishment; and FIG. 4 is a flow diagram illustrating operation of a message priority management application.

DETAILED DESCRIPTION OF THE PREFERRED EMBODIMENT

Figure 1:
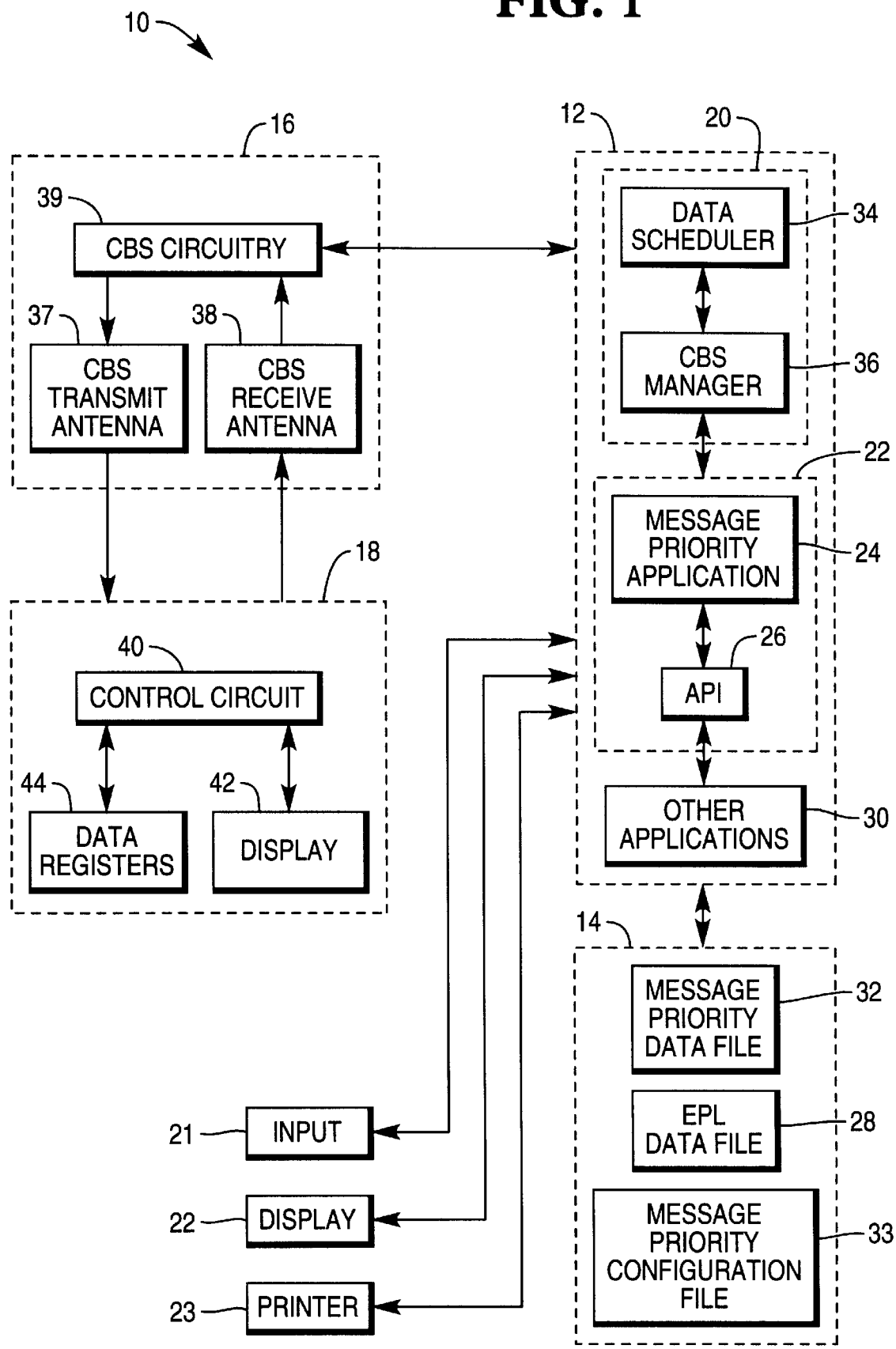
FIG. 1 is a block diagram of an electronic price labels system.

Referring now to FIG. 1, electronic price label (EPL) system 10 includes computer 12, storage medium 14, communication base stations (CBSs) 16, EPLs 18 input device 21, display 22, and printer 30.

Computer 12 executes EPL control software 20, EPL message priority software 22, and other applications 30 which control EPL message priority software 22. EPL control software 20 records, schedules, and transmits all messages to EPLs 18 through CBSs 16, and receives and analyzes status messages from EPLs 18 through CBSs 16. Such messages include queries to EPLs 18 requesting an acknowledgment signal. Preferably, EPLs 18 do not initiate communication with computer 12, they only respond to requests from computer 12.

To assist with execution of certain tasks performed by EPL control software 20, computer 12 includes a built-in time keeping device, commonly referred to as a system clock, which is synchronized with current time, in order to automatically execute the tasks at their scheduled times.

EPL control software 20 primarily includes data scheduler 34 and CBS manager 36. Data scheduler 34 schedules price change and other messages to be sent to EPLs 18 through CBSs 16.

CBS manager 36 schedules the actual transmission of messages to EPLs 18 and the reception of messages from EPLs 18.

EPL message priority software 22 includes EPL message priority application 24 and application programming interface (API) 26. EPL message priority application 24 temporarily stores regularly displayed information for an EPL, causes the EPL to display temporary information during a special promotion, and causes the EPL to display the regular information following expiration of the special promotion. EPL message priority application 24 stores the regularly displayed information for an EPL in message priority data file 32 in accordance with priority rules stored within message priority configuration file 33.

API 26 allows other applications 30 to control EPL message priority application 24. Other applications 30 automatically add records to message priority data file 32, including messages for display and priorities associated with the messages.

Applications 30 include applications that promote items on a "buy one, get one" basis, applications that promote items on a "buy X, get Y" basis, where Y can be an item or other reward such as points, applications that limit sales of items, such as on Sunday, applications that provide suggested retail pricing, applications that provide member discounts, applications that provide manufacturer and departmental promotional messages, and applications that sell items under government subsistence programs.

Applications 30 automatically obtain price and schedule information from PLU data file 44. For example, every PLU item may have a flag field (FS) that states that the item can be purchased with food stamps (FS=1) or cannot be purchased with food stamps (FS=0).

In order to avoid priority conflicts among other applications 30, operation of EPL message priority application 24 is governed by message priority configuration file 33, which contains rules which establish priority among applications 30. For example, if messages associated with Advertisements, Temporary Price Reductions, In store Manager's specials, and New Items are each implemented by different applications 30, one priority rule might be Advertisements>Temporary Price Reductions>In store Manager's specials>New Items, in which Advertisements have the highest priority and New Items have the lowest priority.

Storage medium 14 is preferably a fixed disk drive. Storage medium 14 stores EPL data file 28, message priority data file 32, and message priority configuration file 33.

CBSs 16 each include one transmit antenna 37 and up to four receive antennas 38 for transmitting and receiving messages between CBSs 16 and EPLs 18. CBSs 16 each include CBS circuitry 39 which controls operation of each CBS 16.

EPLs 18 include control circuit 40, data registers 42, and display 44. Data registers 42 contain data sent by EPL control software 34. Price data is regularly displayed, but, in addition, promotional data may be displayed. Promotional data may be displayed regularly with price data or temporarily, such as during special promotions. One of data registers 42 is reserved for price information. The remaining data registers 42 may be empty or occupied with additional information, such as promotional information. If the EPL is a commonly-used four-register EPL, only three data registers remain for displaying the additional information.

Display 42 displays the data. Control circuit 40 controls operation of FPL 22.

Input device 21 allows an operator to enter temporary display information into message priority data file 32. Input device 21 is preferably a keyboard.

Figure 2:
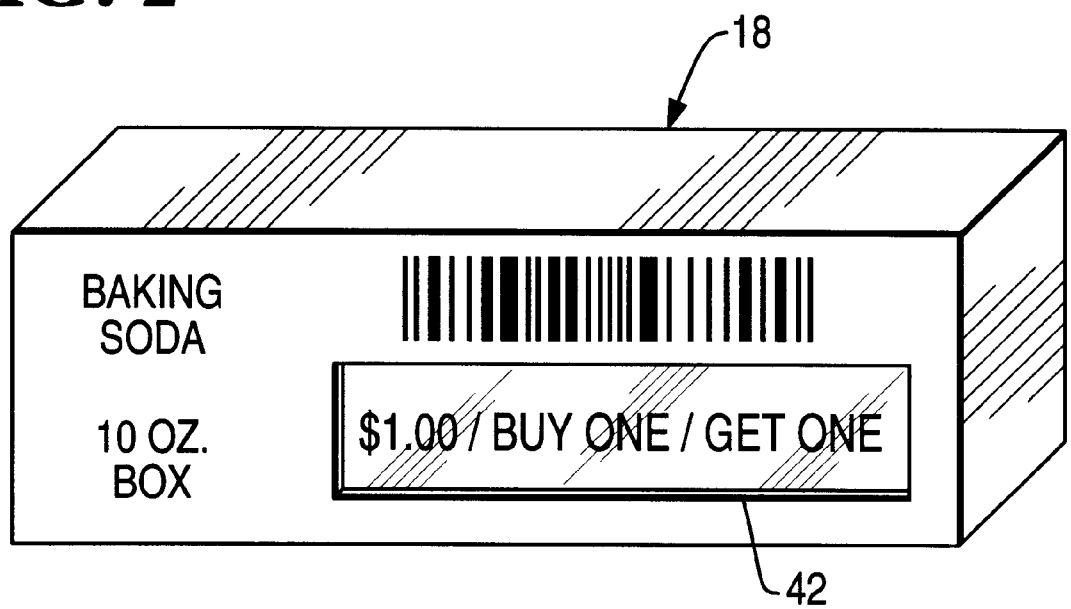
FIG. 2 is a perspective view of an EPL which is displaying a promotional message.

Turning now to FIG. 2, EPL 18 is shown in more detail. The promotional message 30 is shown as "$1.00/BUY ONE/GET ONE".

Turning now to FIG. 3, EPL data file 28 and message priority data file 32 are shown in more detail.

EPL data file 28 includes a line entry for each EPL 22 in EPL system 16. Each line entry has an item identification entry (ITEM ID), an EPL identification entry (EPL ID), and an EPL price verifier entry (EPL CHECK).

Entry ITEM ID identifies a store item. Entry EPL ID identifies which EPL is assigned to the item. Entry EPL CHECK is a checksum value of the digits of the price information that is displayed by display 44.

Message priority data file 32 includes line entries for a number of EPL identification numbers or item identification numbers, a start time for displaying temporary information (START TIME), an end time for restoring regularly displayed information (END TIME), a priority value (PRIORITY) for ranking messages assigned to the same EPL, and the temporary information (MSG).

Message priority data file 32 and message priority configuration file 33 may consist of many files or a single file.

During normal operation, EPL control software 34 sends price and other information to data registers 42. Display 44 displays the price and other information contained within data registers 42.

Message priority application 24 automatically reads message priority data file 32 and causes EPL control software 20 to send messages to EPLs at the times scheduled in message priority data file 32.

Message priority application 24 includes an interface which allows an operator to add, delete, and change entries in message priority data file 32 and message priority configuration file 33.

Other applications 30 control priority of messages for the same EPL by automatically executing calls to API 26; however, other applications 30 control display 42 in accordance with priorities established in message priority configuration file 33.

Turning now to FIG. 4, the operation of EPL message priority application 24 is explained in more detail, beginning with START 60.

In step 62, EPL message priority application 24 reads a record from message priority data file 32.

In step 64, EPL message priority application 24 reads an EPL identification number in the record.

In steps 66–74, EPL message priority application 24 looks for records containing the same EPL identification number to determine a highest priority message.

In step 66, EPL message priority application 24 reads another record in message priority data file 32.

In step 68, EPL message priority application 24 determines whether the EPL identification number in the other record is the same as the EPL identification number. If not, operation proceeds to step 72. If so, EPL message priority application 24 notes the priority in step 70.

In step 72, EPL message priority application 24 determines whether the record is the last record. If not, operation returns to step 66. If so, operation proceeds to step 74.

In step 74, EPL message priority application 24 ranks the noted priorities for the EPL having the identification number.

In step 76, EPL message priority application 24 causes EPL control software 20 to display the messages associated with the highest priority at the scheduled time, followed in order by the other messages of lower priority.

In step 78, EPL message priority application 24 determines whether the record is the last record. If not, operation returns to step 62. If so, operation returns to step 62. Operation may alternatively be modified to exit after one execution and to run on a variable timer (sleep until the timer has expired).

For purposes of illustration, suppose times T1–T4 are chronological times in which:

Time T1 represents a time at which a manager initiates an "in-store manager's special" that is scheduled to run from time T1 until time T4. EPL message priority application 24 sends a message to EPL 18 to display a first message, such as "in-store manager's special".

Time T2 represents a time at which EPL message priority application 24 sends a second message for an advertised special to EPL 18 to run from time T2 until time T3. The priority of this second message is higher than the priority of the first message, so EPL message priority application 24 replaces the display information with the second message, which is "as advertised".

Time T3 represents a time at which the advertised special is over. EPL message priority application 24 determines this, but notices that the in-store manager's special is still active. EPL message priority application 24 replaces the display information with the first message highlighting the in-store manager's special.

Time T4 represents a time at which the in-store manager's special is over, so EPL message priority application 24 removes the first message from the display.

Although the present invention has been described with particular reference to certain preferred embodiments thereof, variations and modifications of the present invention can be effected within the spirit and scope of the following claims.

I claim:

1. A method of managing displayed message priorities for an electronic price label comprising the steps of:
   providing a plurality of records for the electronic price label in a data file, wherein each record contains a different message to be displayed by the electronic price label, a different priority for each message, a start time for each message, and an end time for each message;
   reading the data file to identify all of the records for the electronic price label;
   determining the priorities in the records; and
   displaying the messages at the start times in accordance with the priorities.

2. The method as recited in claim 1, wherein the providing step comprises the substep of:
   recording the records by a computer in response to operator input.

3. The method as recited in claim 1, wherein the providing step comprises the substep of:
   recording the records by a computer in response to inputs received from an application program through an application programming interface.

4. A method of displaying messages by an electronic price label comprising the steps of:
   providing first and second records for the electronic price label in a data file;
   wherein the first record contains a first message for display, a first priority associated with the first message, and a first display period defined by a first start time and a first end time;
   wherein the second record contains a second message different than the first message for display, a second priority associated with the second message which is higher than the first priority, and a second display period defined by a second start time and a second end time;
   wherein the second display period overlaps the first display period during an overlap period;
   reading the data file to identify the first and second records for the electronic price label;
   determining the first and second priorities in the records;
   displaying the first message during the first display period, except during the overlap period; and
   displaying the second message during the second display period.

5. A method of displaying messages by an electronic price label comprising the steps of:
   providing first and second records for the electronic price label in a data file;
   wherein the first record contains a first message for display, a first priority associated with the first message, and a first display period defined by a first start time and a first end time;
   wherein the second record contains a second message different than the first message for display, a second priority associated with the second message which is higher than the first priority, and a second display period defined by a second start time and a second end time;
   wherein the second display period is contained within the first display period;
   reading the data file to identify the first and second records for the electronic price label;
   determining the first and second priorities in the records;
   displaying the first message during the first display period until the second start time;
   displaying the second message from the second start time to the second end time; and
   displaying the first message from the second end time to the first end time.

6. A method of managing displayed message priorities for an electronic price label comprising the steps of:
   receiving a plurality of different messages to be displayed by the electronic price label, a priority for each message, a start time for each message, and an end time for each message for storage in a data file from a plurality of application programs through an application programming interface;
   establishing new priorities for the messages based upon different application priorities assigned to the application programs;
   recording the different messages, the new priorities, the start times, and the end times in a data file;
   reading the data file Lo identify all of the different messages for the electronic price label;
   determining the new priorities associated with the different messages in the records; and displaying the different messages at the start times in accordance with the new priorities.

7. A system for managing displayed message priorities for an electronic price label comprising:

a computer which stores a plurality of records for the electronic price label in a data file;

wherein each record contains a different message to be displayed by the electronic price label, a different priority for each message, a start time for each message, and an end time for each message;

wherein the computer reads the data file to identify all of the records for the electronic price label, determines the priorities in the records, and displays the messages at the start times in accordance with the priorities.

8. The system as recited in claim 7, wherein the computer records the records in response to operator input.

9. The system as recited in claim 7, wherein the computer records the records in response to inputs received from an application program through an application programming interface.

10. The system as recited in claim 7, wherein the computer records the records in response to inputs received from application programs through an application programming interface and establishes new priorities for the messages based upon different application priorities assigned to the application programs.

* * * * *

UNITED STATES PATENT AND TRADEMARK OFFICE
CERTIFICATE OF CORRECTION

PATENT NO. : 6,021,395
DATED : February 1, 2000
INVENTOR(S) : John C. Goodwin, III It is certified that error appears in the above-indentified patent and that said Letters Patent is hereby corrected as shown below:

Column 6, line 60, delete "Lo" and substitute
--to--.

Signed and Sealed this

Seventeenth Day of April, 2001

Attest:

NICHOLAS P. GODICI

*Attesting Officer*   Acting Director of the United States Patent and Trademark Office